May 12, 1959  R. C. FORD  2,885,966
ROTARY PUMPS
Filed Jan. 24, 1956

Inventor:-
Reginald Clarence Ford

2,885,966

ROTARY PUMPS

Reginald Clarence Ford, Coventry, England

Application January 24, 1956, Serial No. 561,123

3 Claims. (Cl. 103—149)

This invention relates to rotary pumps of the kind wherein a rolling member is mounted for rolling movement in a pump body about the axis of the latter's interior whilst a fluid passageway formed partly or wholly of resilient flexible material is provided in the pump body which passageway communicates the pump inlet bore with the outlet thereof, said rolling member being adapted to effect compression of a resilient flexible wall of the passageway in order to cause suction of fluid into the latter at the inlet for discharge at the outlet by virtue of the fluid being urged along the passageway in front of the rolling member applying pressure to the resilient flexible wall.

The object of the present invention is to provide improved means whereby compression of the resilient flexible wall of the passageway is effected due to the action of the rolling member with a view to avoiding or minimising pulsation of the fluid flow through the pump which has hitherto been a characteristic disadvantage with this kind of pump.

A further object is to provide a pump of this kind in which wear (especially of the resilient flexible wall) is kept to a minimum whilst a still further object is to provide such a pump which is capable of inexpensive construction with the minimum of accurate machining and fitting.

Figure 1:
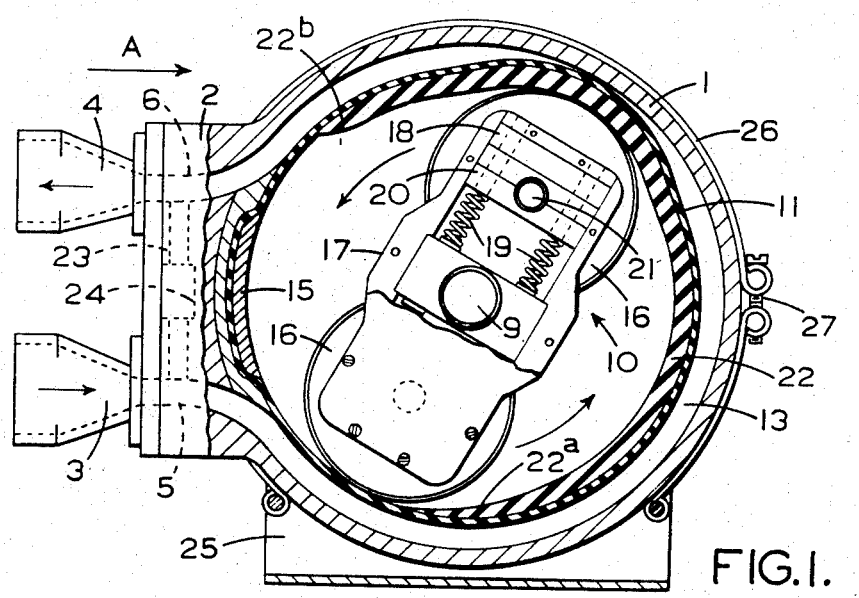
Figure 2:
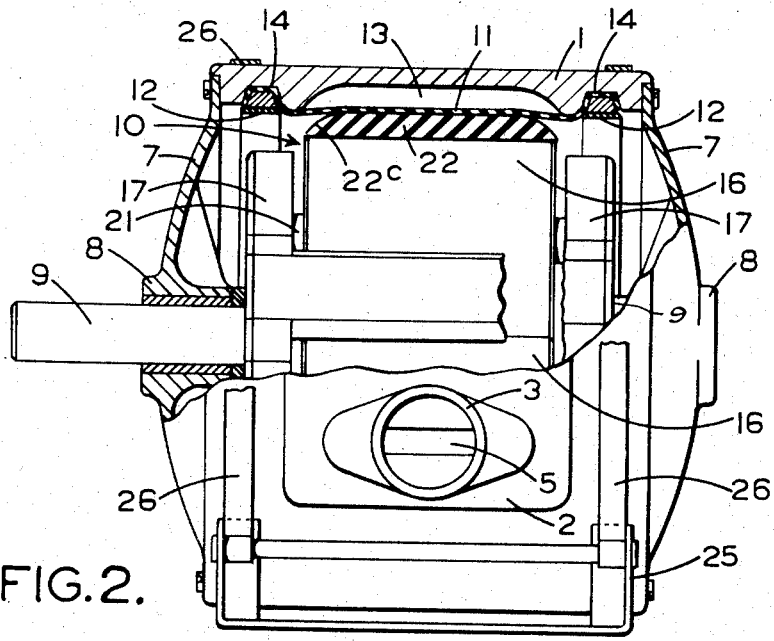

In the accompanying drawings:

Figure 1 is an elevation of a rotary pump according to this invention mainly in section to reveal interior construction and Figure 2 is a view of the pump shown in Figure 1 as seen from the direction of the arrow A and partly in axial plane section.

Referring to the drawings the pump body 1 is of general hollow cylindrical form with an integral or attached block 2 which carries the inlet and outlet connections 3, 4 and ducts thereto 5, 6 respectively.

The body 1, inlet and outlet connections 3, 4 and also end plates 7, 7 (Figure 2) closing the ends of the body are preferably produced as die-castings ready for assembly with the minimum of machining. To facilitate casting, the body 1 may be produced as two semi-circular halves subsequently bolted or otherwise secured together. Alternatively, the above mentioned parts may be moulded in plastic material or produced by fabrication from tubular and sheet metal or like readily available stock. If desired the body 1 may be of glass or other light transmitting material to enable fluid flow through the pump to be observed.

The end plates 7, 7 are provided with bearings 8, 8 coaxial with the cylindrical interior of the body 1 which bearings receive a shaft or stub shafts 9, 9 (Figures 1 and 2) whereby a rolling member is supported for rotation in the body 1.

The fluid passageway connected between the inlet 3 and outlet 4 and formed at least partially of resilient flexible material may be provided in a number of ways and may comprise a tube of rubber or like material which may be of flat rectangular or similar section located in an annular groove or recess in the body 1, one end of the tube having a fluid tight fit with the inlet 3 or duct 5 thereto and the other similarly connected to the outlet 4.

However, as shown in the drawings the passageway is provided by means of a liner 11 of sheet rubber or like resilient and flexible material which is fitted concentrically within the body 1 and is clamped in position at its edges by expansible rings 12, 12 (Figure 2) so that the liner 11 extends across a groove 13 around the interior of the body 1 to form a fluid passageway, the liner 11 thus constituting the resilient flexible wall of the latter.

The groove 13 communicates with the inlet 3 and outlet 4 by the ducts 5, 6 which are internally formed to change the cross section of the groove 13 to the circular bores of the inlet and outlet without constriction.

As shown the expansible rings 12 are of taper form in cross section and force the edge portions of the liner 11 into grooves 14 of complementary form in order to secure the liner 11 in position in a fluid tight manner.

Instead of the pump body 1 being formed with an internal annular groove 13, its interior may be of plain cylindrical form in which case the liner 11 is of thicker material at its edges in order to form it with an outer groove, which together with the inner wall of the pump body 1 forms the fluid passageway. For this purpose the liner may be either moulded in rubber or of built-up laminated construction.

Where a liner is employed, as in the particular example shown, the said liner 11 is clamped to the body 1 (or block 2) by a clamping member 15 between the ducts 5, 6 in order to obturate the fluid passageway at this point for normal working of the pump.

As is usual in pumps of this kind rolling pressure is applied to the liner or wall 11 of the fluid passageway by a rolling member 10 consisting of a pair of diametrically opposed rollers 16, 16 rotatable in a carrier frame or assembly 17 in turn journalled by the aforesaid stub shafts 9 in the bearings 8 on the end plates 7 to the body 1. For a balanced action and for avoiding pulsation in accordance with this invention as hereinafter referred to, two, three or more equi-spaced rollers 16 are preferred to a single roller.

If desired the bearings 8 or their equivalents may be disposed at a distance from the pump body 1 when it is desired to avoid any heat that is generated in the bearings having a detrimental or dangerous effect on the fluid being pumped.

As shown each roller 16 may be resiliently mounted in the carrier frame 17, such as by means of the springs 19 acting on the bearing block 20 slidable in the frame 17 against a limit stop 18 which may be of rubber and receiving the roller spindle 21. In this way each roller is able to yield radially above a predetermined pressure to minimise damage to the liner 11 in the event of excessive pressure or a solid body in the passageway and also accommodate possible manufacturing inaccuracies in the co-axial alignment of the carrier frame 17 with the body 1. It is to be understood that the springs 19 or other resilient mounting for the rollers 16 are of sufficient strength to overcome the resilience of the liner 11 and a track member 22 thereto as well as fluid pressure during normal operation of the pump.

In accordance with this invention the track member to the liner 11 is of varying effective thickness in a radial direction relative to the pump axis such that its co-action between the rollers 16 and liner 11 causes a pre-determined degree and extent of compression of the latter.

In order to provide a pump whereby pulsation in the fluid flow therethrough is kept to a minimum the track member 22 is so arranged in relation to the direction of rolling movement of the roller 16, 16 whereby it commences from nil or ineffective thickness at or at a short distance after the inlet duct 5 and gradually increases as at 22ª to a working thickness which as shown, may remain uniform or gradually increase to ultimately rapidly taper off to nil or ineffective thickness as at 22ᵇ just short of the outlet duct 6.

As will be seen from Figure 1 the working thickness of the track member 22 is such as to cause local closing or very considerable constriction of the fluid passageway by the contacting roller 16 and the extent of the uniform or working thickness of the track member is such that, in the case of the two rollers 16 shown, there is always one of the latter subjecting the liner 11 to rolling pressure. For this purpose the angular extent of the working thickness of the track member is at least 180° in relation to the pump axis.

By this form and arrangement of track member 22 the gradual commencement of compression of the liner 11 avoids momentary shut off by constriction or closing of the passageway immediately at the inlet duct 5 which otherwise causes pulsation of the fluid flow through the pump.

The track member 22 also serves to protect the liner 11 against wear due to the rollers 16 and may be integral with the liner 11 or may, as shown, be a separate member of rubber bonded thereto, the rubber of said track member 22 having hard wearing characteristics or properties with some degree of resilience as against the greater elasticity and generally softer nature of rubber suitable for the liner 11.

For avoiding or minimising chafing of the liner 11 the side edges of the track member 22 are rounded or chamfered as at 22ᶜ in Figure 2, the sides of the groove 13 being similarly rounded or formed in a complementary manner.

In an alternative embodiment of this invention (not shown) the track member 22 may be bonded or otherwise secured to a flexible strip of steel or other suitable material which actually contacts the liner 11. The strip is preferably secured in position at one end only such as to the clamping member 15, or by means of the latter, whilst the other end of the strip is left free and terminates at or near the communication of the fluid passageway or groove 13 with the outlet duct 6.

The strip is thus free to follow flexing movement of the liner 11 and track member 22 which latter may if desired be of leather or other hard wearing flexible material instead of rubber. By mounting the track member 22 in this way it is readily removable together with the strip for replacement purposes.

It will be readily understood that the track member 22 may be applied to a resilient flexible tubular member of rubber or the like providing the fluid passageway instead of a liner 11 in any of the ways described above in relation to the latter.

The pump preferably includes a by-pass between the inlet 3 and outlet 4 against overload and this may be effected by resiliently clamping the liner 11 by the member 15 which is then suitably spring mounted. However, the by-passing may be effected in any other suitable way such as by the duct 23 in the block 2 leading via a non-return valve indicated at 24 from the outlet duct 6 to the inlet duct 5.

As shown in the drawings the pump body 1 is located on a mounting base or cradle 25 by means of straps or bands 26 anchored on the latter and passing round the body 1, a connector screw 27 being provided to each band to draw the latter tightly about the body. By mounting the body in this way the pump can be bodily turned about its axis on the cradle 25 in order to position the inlet 3 and outlet 4 for pipe connection during installation of the pump or on alteration of the pipe work thereto.

I claim:

1. A rotary pump of the character described comprising in combination a pump body having an inlet and outlet thereto; a fluid passageway in said pump body about the axis of the latter's interior and formed at least partly of resilient flexible material, said passageway having a wall of resilient flexible material and communicating the pump inlet with the outlet thereof; a rolling member mounted for rotation within said pump body about the axis of the latter's interior, the radius of rotation about said axis being such that said roller applies rolling pressure to said resilient flexible wall to effect suction of fluid at the inlet and propulsion of fluid along said passageway in front of the rolling member for discharge at the outlet; and a flexible track member connected to the roller adjacent surface of said resilient flexible wall of the passageway for actual contact with the rolling member the thickness of said track member gradually increasing from nil or ineffective thickness to a maximum thickness for co-action with the rolling member in order to effect gradual commencement of compression of the resilient flexible wall of the fluid passageway adjacent the communication of the latter with the pump inlet.

2. A rotary pump of the character described comprising in combination a pump body having an inlet and outlet thereto; a fluid passageway in said pump body about the axis of the latter's interior and formed at least partly of resilient flexible material, said passageway having a wall of resilient flexible material and communicating the pump inlet with the outlet thereof; a rolling member mounted for rotation within said pump body about the axis of the latter's interior, the radius of rotation about said axis being such that said roller applies rolling pressure to said resilient flexible wall to effect suction of fluid at the inlet and propulsion of fluid along said passageway in front of the rolling member for discharge at the outlet; and a flexible track member connected to the roller adjacent surface of said resilient flexible wall of the passageway for actual contact with the rolling member, the thickness of said track member gradually increasing from nil or ineffective thickness to a maximum thickness for co-action with the rolling member in order to effect gradual commencement of compression of the resilient flexible wall of the fluid passageway adjacent the communication of the latter with the pump inlet, said maximum thickness being uniform for maximum compression of the resilient flexible wall until termination of the track member or reduction thereof to ineffective thickness adjacent the communication of the fluid passageway with the pump outlet.

3. A rotary pump of the character described and according to claim 2 wherein the uniform maximum thickness of the track member extends for at least 180° in angular extent relative to the pump axis.

References Cited in the file of this patent

UNITED STATES PATENTS

| | | |
|---|---|---|
| 664,507 | Singer | Dec. 25, 1900 |
| 2,314,281 | Knott | Mar. 16, 1943 |
| 2,519,642 | Ford | Aug. 22, 1950 |
| 2,693,766 | Seyler | Nov. 9, 1954 |